United States Patent
Gilliland et al.

(10) Patent No.: US 12,043,375 B2
(45) Date of Patent: Jul. 23, 2024

(54) BEARING RESTRAINT FOR USE ON A ROTOR MAST

(71) Applicant: Bell Textron Inc., Fort Worth, TX (US)

(72) Inventors: Colton Gilliland, Northlake, TX (US); Russell Mueller, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 67 days.

(21) Appl. No.: 17/547,578

(22) Filed: Dec. 10, 2021

(65) Prior Publication Data
US 2023/0182896 A1     Jun. 15, 2023

(51) Int. Cl.
*F16C 35/063*     (2006.01)
*B64C 27/12*      (2006.01)
*B64C 27/32*      (2006.01)

(52) U.S. Cl.
CPC .............. *B64C 27/32* (2013.01); *B64C 27/12* (2013.01)

(58) Field of Classification Search
None
See application file for complete search history.

(56) References Cited

U.S. PATENT DOCUMENTS

| | | | | |
|---|---|---|---|---|
| 3,322,200 A | * | 5/1967 | Tresch | B64C 27/32 416/114 |
| 3,486,832 A | * | 12/1969 | Carnell | B64C 27/14 416/114 |
| 4,240,677 A | * | 12/1980 | Payne | F16C 35/063 384/441 |
| 11,041,525 B1 | * | 6/2021 | Mueller | F16C 33/583 |

FOREIGN PATENT DOCUMENTS

DE   102016213719 B3 * 11/2017 ............ F16C 35/063

* cited by examiner

*Primary Examiner* — Kayla Mccaffrey
(74) *Attorney, Agent, or Firm* — Akona IP PC

(57) ABSTRACT

A bearing restraint, for use on a rotorcraft with a rotor mast and bearing assembly. The bearing restraint interfacing with a mast groove along the rotor mast to longitudinally restrain the bearing assembly. The bearing restraint includes a pilot ring, groove collar, and retaining ring.

19 Claims, 12 Drawing Sheets

BEARING RESTRAINT FOR USE ON A ROTOR MAST

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

CROSS REFERENCE TO RELATED APPLICATIONS

Not applicable.

TECHNICAL FIELD OF THE DISCLOSURE

The present disclosure relates, in general, to a rotor mast assembly operable for use on a rotorcraft and, in particular, to a bearing restraint configured to restrain a bearing for a rotatable driveshaft.

BACKGROUND

Certain rotorcraft are capable of taking off, hovering, and landing vertically with little or no forward momentum. One such rotorcraft is a helicopter. Helicopters have one or more main rotors that generate a lifting force by rotating a plurality of rotor blades. The plurality of rotor blades is rotated by and structurally coupled to a rotor mast. The rotor mast is, in turn, powered and spun about a central axis by a main engine and a transmission system. As the rotor mast spins, forces and moments are generated that threaten to push the rotor mast out of alignment with the central axis. As a result, the rotor mast must be radially restrained.

One means of restraining the rotor mast is a radial bearing assembly. The radial bearing assembly circumferentially encompasses and couples to the rotor mast. One means of coupling the radial bearing assembly to the rotor mast is threading. Similar to a nut fastener, a threaded surface on an inside surface of the radial bearing assemblies can be torqued and mated to a threaded surface on an outside surface of the rotor mast. It has been found, however, that threaded surfaces are susceptible to fatigue failures and poorly accommodate the forces and moments generated by the rotor mast.

SUMMARY

In a first aspect, the present disclosure is directed to a drive system, the drive system having a driveshaft, a first bearing, and a bearing restraint. The driveshaft may include a first end, a second end, and a central axis about which a hollow center and a driveshaft wall are oriented. The driveshaft wall may include an interior surface defining the outer boundary of the hollow center and an exterior surface positioned further outward from the central axis. The exterior surface may define a longitudinal groove between the first end and the second end, wherein the exterior surface may be configured to shift inward towards the central axis at the longitudinal groove. The first bearing may be positioned beneath the longitudinal groove, in closer proximity to the second end of the driveshaft. The bearing restraint may be positioned above the first bearing, in closer proximity to the first end of the driveshaft. The bearing restraint may include a protruding structure and a planar surface. A portion of the protruding structure may lodge inside the longitudinal groove; and another portion of the protruding structure may protrude outside of the longitudinal groove. The planar surface may mount to the first bearing.

In certain embodiments, the drive system may have a driveshaft in the form of a rotor mast for a rotor system. Additionally, the drive system may include a second bearing coaxial to the first bearing. Furthermore, the second bearing may be positioned above the longitudinal groove, in closer proximity to the first end of the driveshaft. In other embodiments, the protruding structure may be a groove collar, the groove collar including both an inner surface lodged inside the longitudinal groove and an outer surface protruding outside of the longitudinal groove above the planar surface, in closer proximity to the first end of the driveshaft. Additionally, the planar surface may be a pilot ring mounted immediately beneath the longitudinal groove, in closer proximity to the second end of the driveshaft. Furthermore, the bearing restraint may further include a retaining ring mounted to the pilot ring. Further still, the retaining ring may be configured to compress the groove collar in such a manner that the retaining ring pushes in on the outer surface of the groove collar and forces the inner surface of the groove collar inward towards the longitudinal groove. Moreover, the groove collar may include a first collar piece and a second collar piece, wherein the first collar piece and second collar piece can combine to form a closed perimeter. Finally, the retaining ring may be configured to compress the first collar piece and second collar piece together.

In a second aspect, the present disclosure is directed to a method of constructing a bearing restraint for a rotor mast assembly. The method may include providing a rotor mast, a bearing, and a bearing restraint. The rotor mast may include a first end, a second end, and a central axis about which a hollow center and mast wall are oriented. The mast wall may include an interior surface defining the outer boundary of the hollow center, an exterior surface positioned further outward from the central axis. The exterior surface may define a longitudinal groove between the first end and second end of the rotor mast, with the exterior surface configured to shift inward towards the central axis at the longitudinal groove. The bearing restraint may include a protruding structure and a planar surface. The method may further include positioning the bearing beneath the groove, in closer proximity to the second end of rotor mast; then positioning the bearing restraint above the bearing, in closer proximity to the first end of the rotor mast. Then, the method may include lodging the protruding structure into the longitudinal groove and allowing a portion of the protruding structure to protrude outward from the longitudinal groove. Finally, the method may include mounting the planar surface to the bearing.

In certain embodiments, the protruding structure of the above method may be a groove collar including an inner surface and an outer surface; wherein, the method involves lodging the inner surface within the longitudinal groove and allowing the outer surface to protrude outside of the longitudinal groove. Additionally, the planar surface of the above method may be a pilot ring; wherein, the method involves mounting the pilot ring immediately beneath the longitudinal groove, in closer proximity to the second end of the rotor mast. Furthermore, the method may include compressing the groove collar with a retaining ring in such a manner that the retaining ring pushes in on the outer surface of the groove collar and forces the inner surface of the groove collar inward towards the longitudinal groove. Finally, the method may include mounting the retaining ring to the pilot ring.

In a third and aspect, the present disclosure is directed toward an aircraft, the aircraft having a fuselage and a rotor system. The rotor system includes a rotor hub, a plurality of rotor blades, a rotor mast, a radial bearing, and a bearing restraint. The rotor mast, in turn, may include a first end, a second end, and a central axis about which a hollow center and a mast wall are oriented. The rotor mast may include an interior surface defining the outer boundary of the hollow center and an exterior surface positioned further outward from the central axis. The exterior surface may define a longitudinal groove between the first end and the second end, wherein the exterior surface is configured to shift inward towards the central axis at the longitudinal groove. The first bearing may be positioned beneath the longitudinal groove, in closer proximity to the second end of the rotor mast. The bearing restraint may be positioned above the first bearing, in closer proximity to the first end of the rotor mast. The bearing restraint may include a protruding structure and a planar surface. A portion of the protruding structure may lodge inside the longitudinal groove; and another portion of the protruding structure protrudes outside of the longitudinal groove. The planar surface may mount to the first bearing.

In certain embodiments, the rotor system may be configured to generate lift. Additionally, the protruding structure may be a groove collar, the groove collar including both an inner surface lodged inside the longitudinal groove and an outer surface protruding outside of the longitudinal groove above the planar surface, in closer proximity to the first end of the rotor mast. Furthermore, the planar surface may be a pilot ring mounted immediately beneath the longitudinal groove, in closer proximity to the second end of the driveshaft. Finally, the bearing restraint may further include a retaining ring configured to compress the groove collar, in such a manner that the retaining ring pushes in on the outer surface of the groove collar forcing the inner surface of the groove collar inward towards the longitudinal groove.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not limit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Figure 1A:
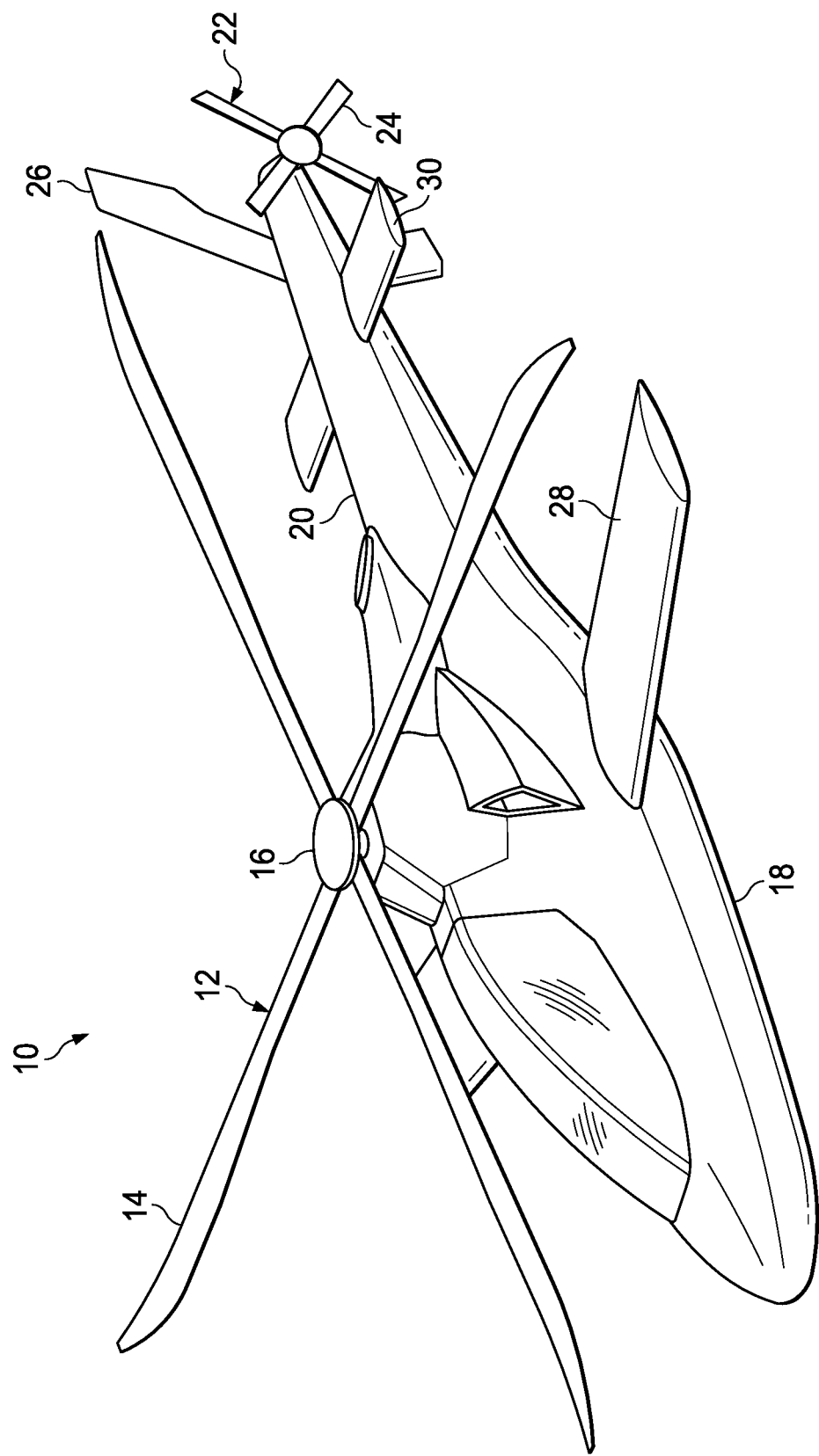
FIGS. 1A-1C are schematic illustrations of a rotorcraft having a multimode powertrain in accordance with embodiments of the present disclosure.
Figure 1B:
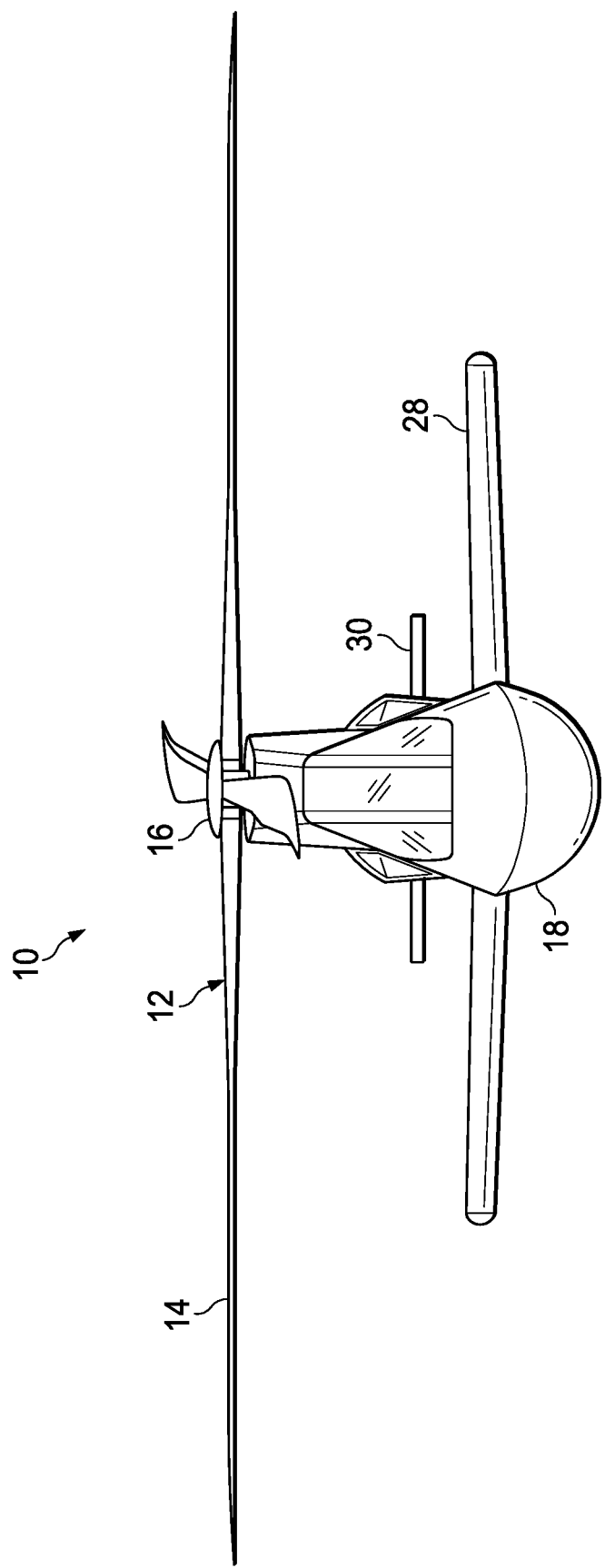
Figure 1C:
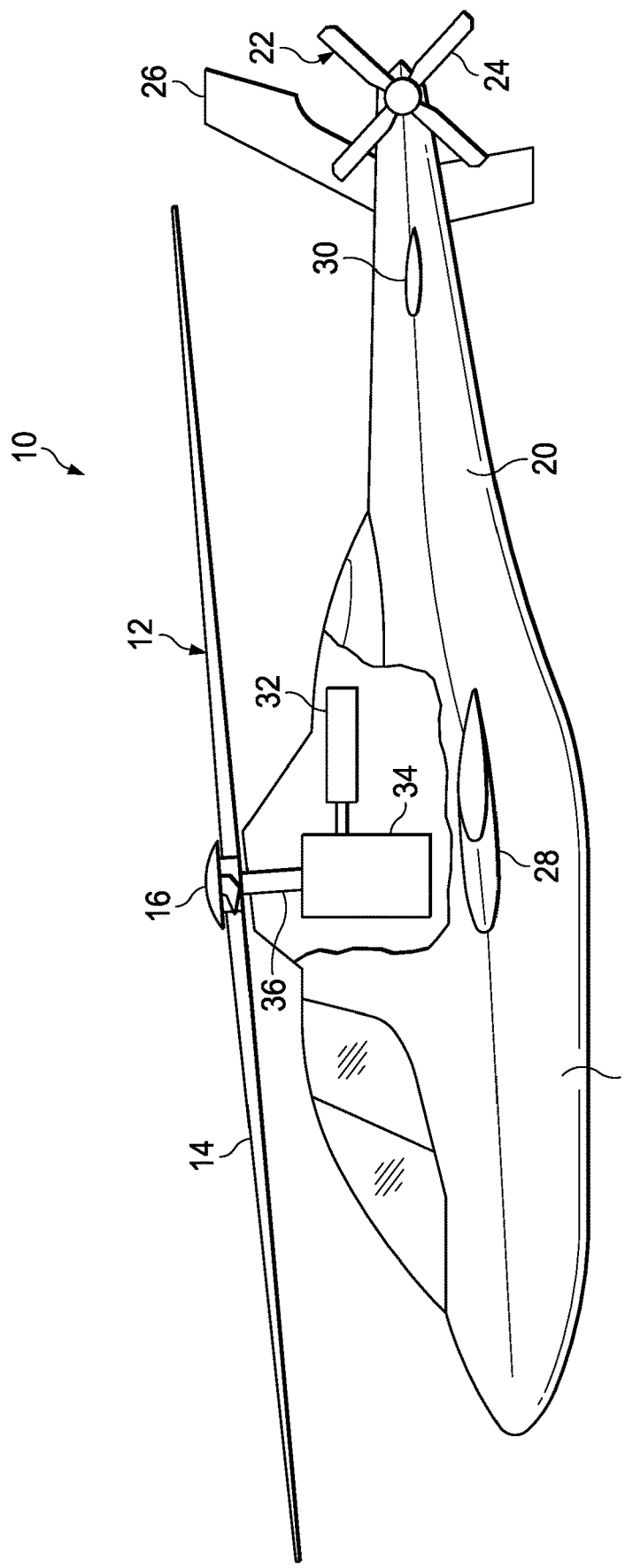

Referring to FIGS. 1A-1C in the drawings, a rotorcraft in the form of a helicopter is schematically illustrated and generally designated 10. The primary propulsion assembly of helicopter 10 is a main rotor assembly 12. Main rotor assembly 12 may include a plurality of rotor blades 14 extending radially outward from a main rotor hub 16. Main rotor assembly 12 is coupled to a fuselage 18 and is rotatable relative thereto. The pitch of rotor blades 14 can be collectively and/or cyclically manipulated to selectively control direction, thrust and lift of helicopter 10. A tailboom 20 is coupled to fuselage 18 and extends from fuselage 18 in the aft direction. An anti-torque system 22 may include a tail rotor assembly 24 coupled to an aft end of tailboom 20. Anti-torque system 22 controls the yaw of helicopter 10 by counteracting the torque exerted on fuselage 18 by main rotor assembly 12. In the illustrated embodiment, helicopter 10 may include a vertical tail fin 26 that provides stabilization to helicopter 10 during high speed forward flight. In addition, helicopter 10 may include wing members 28 that extend laterally from fuselage 18 and horizontal stabilizers 30 that extend laterally from tailboom 20. Wing members 28 and horizontal stabilizers 30 provide lift to helicopter 10 responsive to the forward airspeed of helicopter 10, thereby reducing the lift requirement on main rotor assembly 12 and increasing the top speed of helicopter 10.

Main rotor assembly 12 receives torque and rotational energy from a main engine 32 and a transmission system 34 within the fuselage 18. The main engine 32 may be coupled to the transmission system 34 by a clutching and shafting mechanism. Transmission system 34 may be, in turn, coupled to the main rotor assembly 12 by a rotor mast 36 mechanically coupled to the main rotor hub 16. Power from the main engine 32 is then used to spin the rotor mast 36. As the rotor mast 36 spins, it rotates the main rotor assembly 12.

It should be appreciated that helicopter 10 is merely illustrative of a variety of aircraft that can implement the embodiments disclosed herein. Indeed, the multimode powertrain of the present disclosure may be implemented on any rotorcraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones and the like. As such, those skilled in the art will recognize that the main rotor assembly and rotor mast disclosure can be integrated into a variety of aircraft configurations. It should be appreciated that even though aircraft are particularly well-suited to implement the embodiments of the present disclosure, non-aircraft vehicles and devices can also implement the embodiments.

Figure 2:
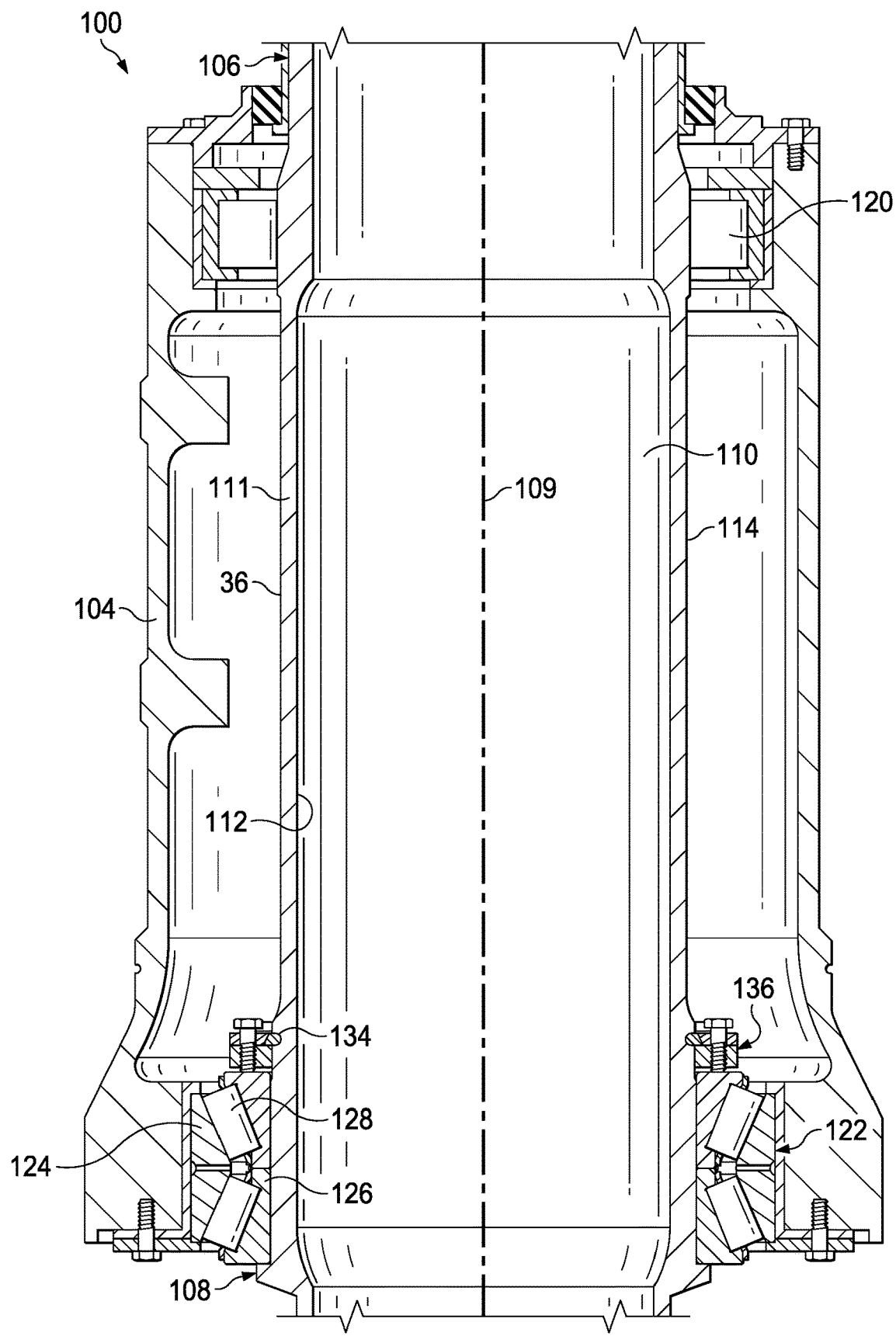
FIG. 2 is an illustration of a rotor mast assembly in accordance with embodiments of the present disclosure.

FIG. 2 is an illustration of a rotor mast assembly 100. The rotor mast assembly 100 includes a rotor mast 36 and a mast housing 104. The rotor mast 36 is encapsulated within the mast housing 104 and centered about a central axis 109. The rotor mast 36 may be a cylindrical shaft including a first end 106, a second end 108, a hollow central shaft 110, and a mast wall 111. The first end 106 is longitudinally located along the topmost portion of the rotor mast 36, proximate to the rotor hub 16 and the plurality of rotor blades 14. The second end 108 is longitudinally located along the bottommost portion of the rotor mast 36, proximate to a gearbox and transmission system. The hollow central shaft 110 may originate at and extend radially outward from the central axis 109. The outward boundary of the hollow central shaft 110 may be defined by the mast wall 111.

The mast wall 111 includes an interior surface 112 and an exterior surface 114. The interior surface 112 is the furthermost inward portion of the mast wall 111, in closest proximity to the central axis 109 and may define the outward boundary of the hollow central shaft 110. By contrast, the exterior surface 114 is the furthermost outward portion of the mast wall 111, in furthest proximity from the central axis 109. The space between the exterior surface 114 and interior surface 112 is the wall thickness of the mast wall 111.

Towards the second end 108 of the rotor mast 36 is a mast groove 134. The mast groove 134 may be a circumferential indentation of a constant longitudinal thickness along the exterior surface 114 of the rotor mast 36. At the mast groove 134, the wall thickness of the rotor mast 36 may decrease and the exterior surface 114 may shift inwards towards the central axis 109. By contrast, at the mast groove 134, the interior surface 112 remains radially fixed relative to the central axis 109. While the mast groove 134 is positioned proximate to the second end 108 of the rotor mast 36, one or more mast grooves may be placed anywhere along the longitudinal length of the rotor mast 36.

One means of spinning the rotor mast 36 is a transmission system. A transmission system may be configured to mechanically couple with the bottom end 108 of the rotor mast 36 using gear joints, spindles, flanges, and other tools and devices. A transmission system may include a gearbox, a clutch, and an output shaft. Generally, the output shaft may be mechanically coupled to a power producing engine or motor. Power from the engine or motor may then be transmitted through the output shaft to the gearbox using the clutch to selectively couple the output shaft to the gearbox. An exemplary embodiment of a gearbox is a planetary gear assembly. The planetary gear assembly can include a sun gear, a plurality of planetary gears, and a ring gear, wherein the sun gear is centered about a central axis and orbited by the plurality of planetary gears. The planetary gears are, in turn, confined within the inner perimeter of the ring gear, which serves as a track along which the planetary gears may selectively move. The output shaft can be configured to spin either the sun gear or the plurality of planetary gears. In turn, the sun gear or the plurality for planetary gears can then spin the plurality of planetary gears or the sun gear respectively. The rotational torque and energy of the planetary gear assembly can then be transmitted to the rotor mast 36.

It should be appreciated that a transmission system is merely one of a multitude of means by which a rotor mast can be powered and spun. Some aircraft may use one or more engines, batteries, motors, or transmission systems to fully power or supplement the spinning of a rotor mast. Additionally, transmission systems may be structurally different from the transmission system described above. Furthermore, some electric vertical takeoff and land aircraft (EVTOLs), may altogether lack a transmission system and instead use some combination of batteries and motors to spin a rotor mast. As such, those skilled in the art will recognize that the main rotor assembly and rotor mast disclosure can be integrated into a variety of aircraft with a multitude of engine, battery, motor, and transmission system arrangements.

As the transmission system spins the rotor mast 36, forces and moments are generated, which can threaten to shift the rotor mast 36 out of alignment with the central axis 109. As such, radial bearing assemblies 120, 122 are needed to radially restrain the rotor mast 36 at its first end 106 and its second end 108. Radial bearing assembly 120 may circumferentially surround a longitudinal portion of the rotor mast 36 and is positioned proximate to the first end 106. Similarly, radial bearing assembly 122 may circumferentially surround a different longitudinal portion of the rotor mast 36 and may be positioned proximate to the second end 108, beneath the mast groove 134. Radial bearing assembly 122 may include an outer race 124, an inner race 126, and a plurality of rollers 128. The plurality of rollers 128 may be positioned between and roll along the outer race 124 and inner race 126 and allow the rotor mast 36 to freely rotate about its central axis 109.

A bearing restraint 136 serves to longitudinally restrain and fix the radial bearing 122 in place. The bearing restraint 136 may circumferentially encompass the rotor mast 36 and may be positioned above the radial bearing 122, in such a manner that the bottommost portion of the bearing restraint 136 comes into contact with the topmost portion of the radial bearing 122. Additionally, the bearing restraint 136 may enshroud and interface with the mast groove 134.

Figure 3:
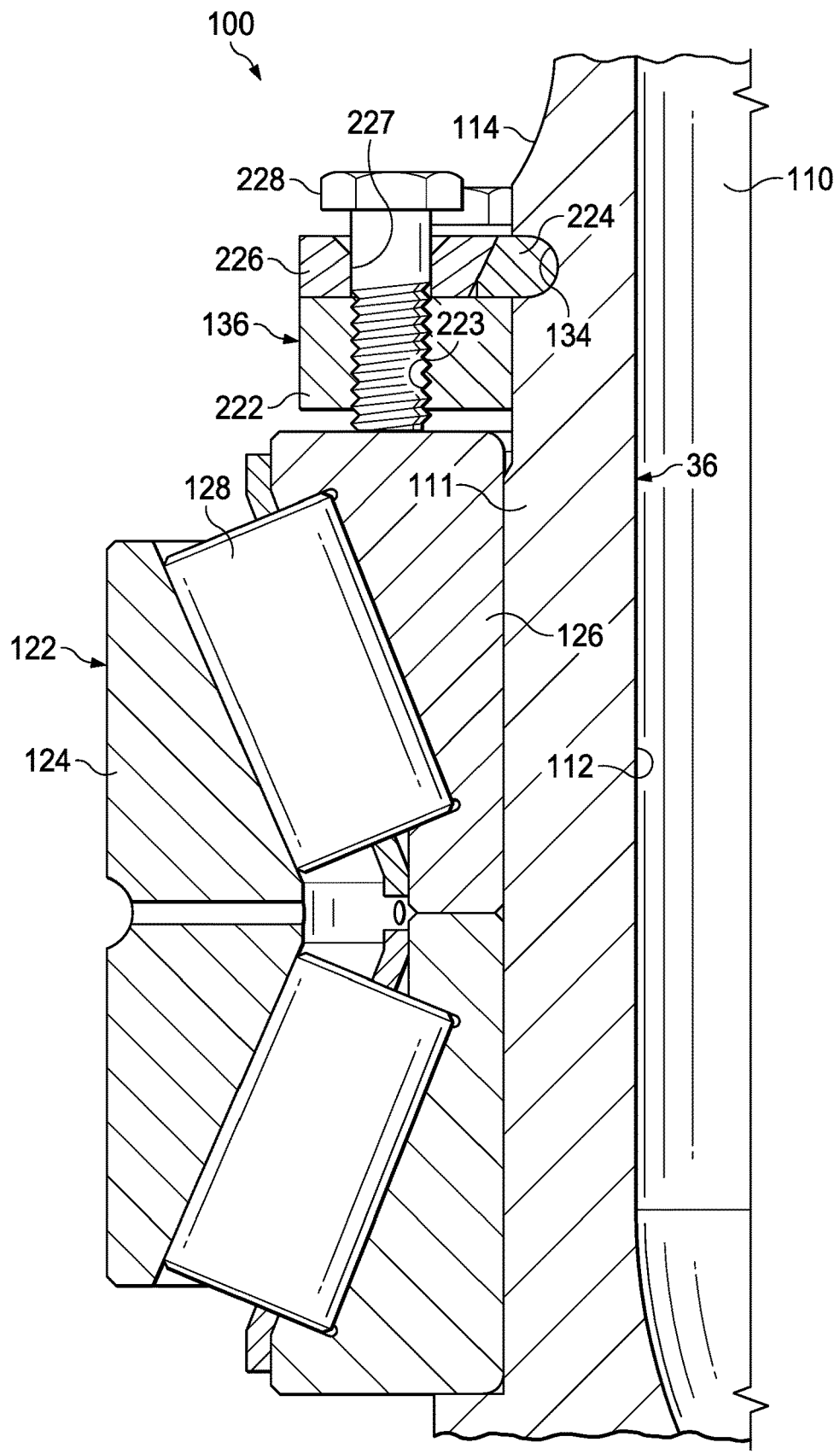
FIG. 3 is a view of a rotor mast assembly in accordance with embodiments of the present disclosure.

Referring to FIG. 3, a view of the bearing restraint 136 is illustrated. The bearing restraint 136 includes a pilot ring 222, a groove collar 224, a retaining ring 226, and a preload bolt 228. The pilot ring 222 is longitudinally situated in a space between the mast groove 134 and the radial bearing 122, with its topmost portion immediately beneath the mast groove 134 and its bottommost portion mounted to the top surface of the radial bearing 122. Above the pilot ring 222, received within the mast groove 134, is the groove collar 224. A portion of the groove collar 224 is housed within the mast groove 134. Another portion of the groove collar 224 protrudes radially outward from the mast groove 134 and rests above the top surface of the pilot ring 222. The retaining ring 226 sits level with the groove collar 224 and mounts with the top surface of the pilot ring 222. The retaining ring 226 pushes the groove collar 224 radially inwards towards the mast groove 134 and forces the groove collar 224 to sit flushed with the mast groove 134 preventing the groove collar 224 from dislodging from the mast groove 134. The pilot ring 222 and retaining ring 226 respectively include a pilot ring aperture 223 and retaining ring aperture 227. Both the pilot ring aperture 223 and retaining ring aperture 227 respectively extends through the longitudinal thickness of the pilot ring 222 and retaining ring 226. The pilot ring aperture 223 and retaining ring aperture 227 are axially aligned with one another to receive the preload bolt 228, which extends through both apertures. The retaining ring aperture 227 is threaded to torque and mate with the preload bolt 228. While FIG. 3 shows only a single pilot ring aperture 223 and a single retaining ring aperture 227, multiple pilot ring apertures and retaining ring apertures are placed across the entire circumference of the pilot ring 222 and retaining ring 226. Each pilot ring aperture and retaining ring aperture is capable of receiving a preload bolt.

Referring to FIGS. 4A-4F, a sequential method for assembling a bearing restraint 320 for a rotor mast assembly 300 is illustrated. The rotor mast assembly 300 includes a rotor mast 301, a gearbox mounting 304 for mechanically coupling the rotor mast 301 to a transmission system, and a radial bearing 312. The rotor mast 301 includes a mast wall 306 with an exterior surface 308, along which a mast groove 310 is situated. The radial bearing 312 is situated beneath the mast groove 310 and includes an outer race 314, an inner race 316, and a plurality of rollers 318 situated there between. The radial bearing 312 further includes a flat top surface 319, which interacts with the bearing restraint 320.

Figure 4A:
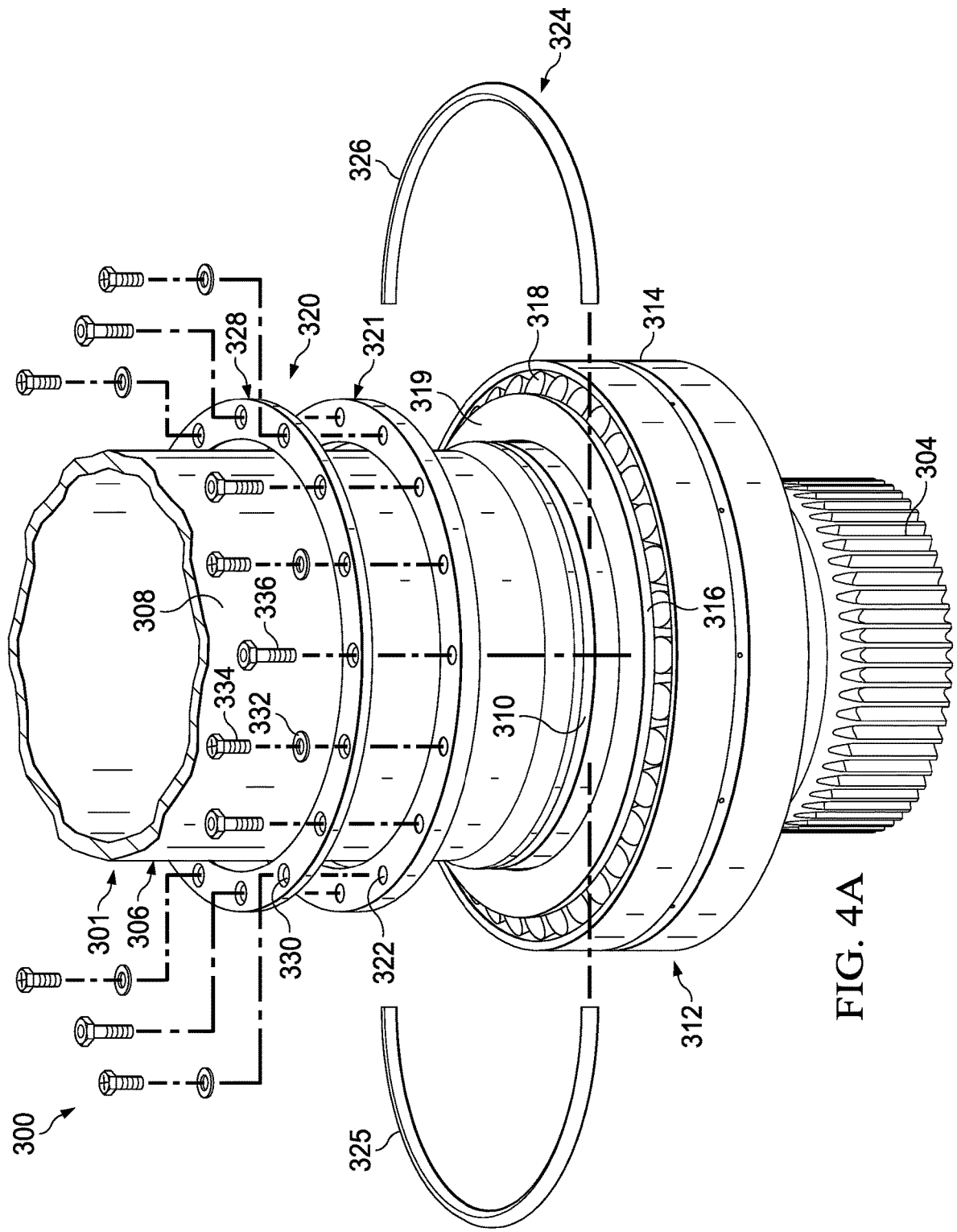
FIGS. 4A-4F are perspective views of sequential method for assembling a bearing restraint for a mast assembly in accordance with embodiments of the present disclosure.

FIG. 4A shows a fully dissembled bearing restraint 320 broken down to its individual components, including a groove collar 324, a pilot ring 321, and a retaining ring 328. The groove collar 324 may include two parts: a first half 325 and a second half 326. The retaining ring 328 and pilot ring 321 have similar dimensions, with the retaining ring 328 formed to rest on top of the pilot ring 321. The retaining ring 328 and pilot ring 321 both include a plurality of apertures 330, 322 along their circumferential length, wherein each of the apertures 330 on the retaining ring 328 coaxially aligns with a corresponding aperture 322 on the pilot ring 321 when the retaining ring 328 and the pilot ring 321 are assembled in the present implementation. The plurality of apertures 330, 322 are formed to receive a plurality of preload bolts 336 and a plurality of retaining ring bolts 334. Each of the plurality of apertures 322 along the pilot ring 321 are threaded to mate with the plurality of preload bolts 336 and plurality of retaining ring bolts 334.

Figure 4B:
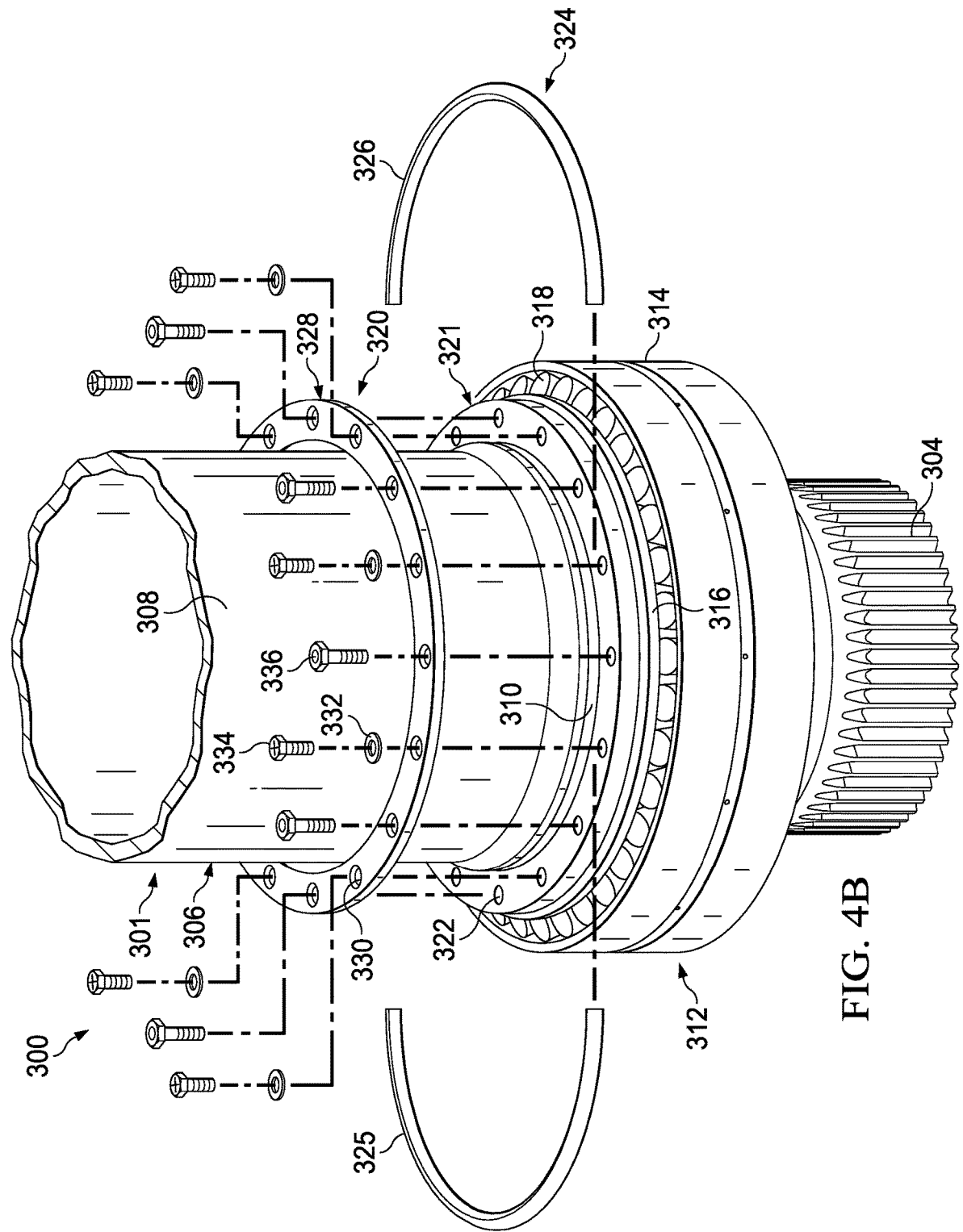

FIG. 4B shows step one in the sequential method for assembling the bearing restraint 320. In step one, the pilot ring 321 is lowered onto the radial bearing 312. The bottom surface of the pilot ring 321 is brought to rest on top of the top flat surface 319 of the radial bearing 312, in such a manner that the top flat surface 319 of the radial bearing 312 is covered by the pilot ring 321. The top surface of the pilot ring 321 rests immediately below the mast groove 310. The pilot ring 321 doesn't overlap with the mast groove 310 and the mast groove 310 remains accessible.

Figure 4C:
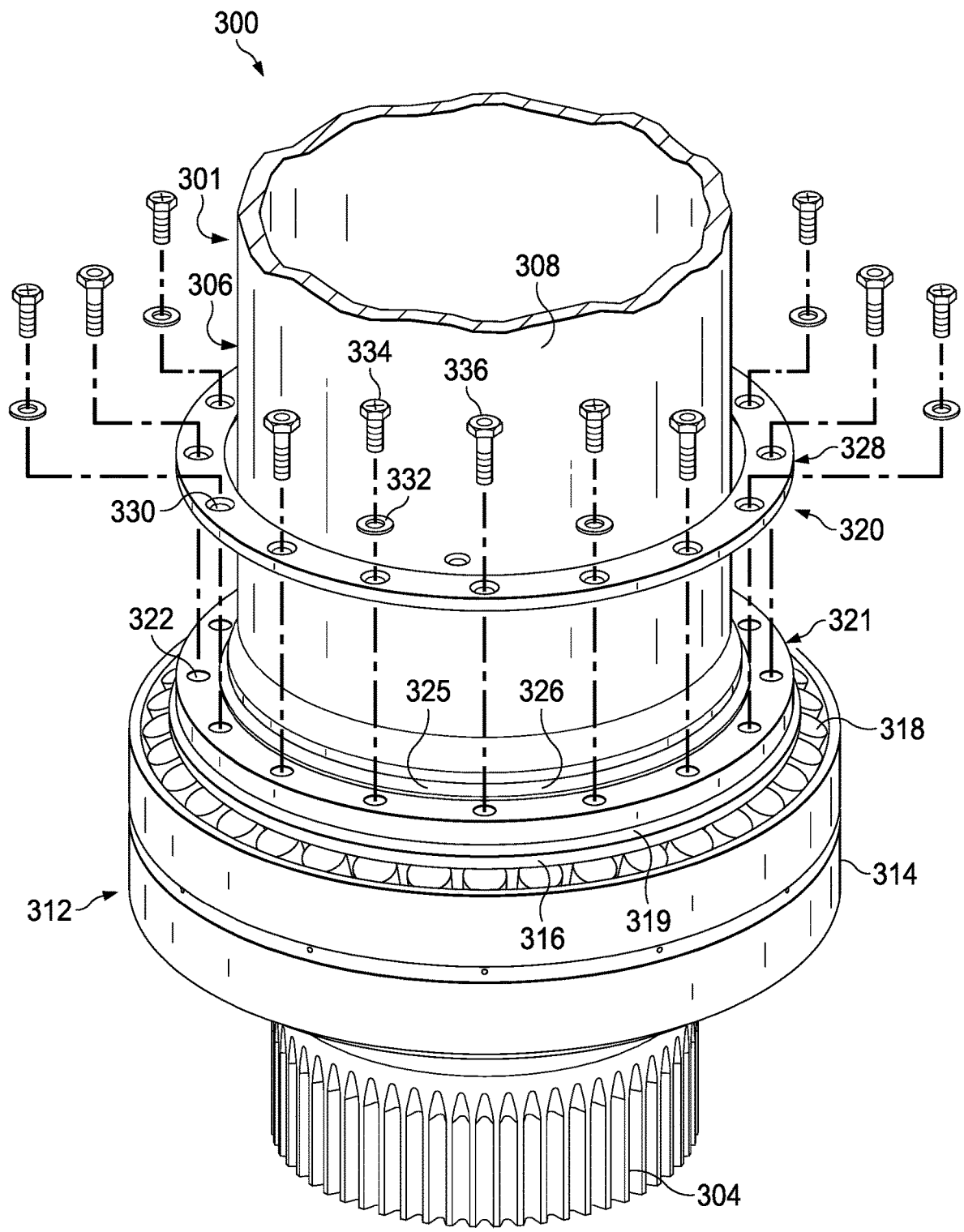

FIG. 4C shows step two in the sequential method for assembling the bearing restraint 320. In step two, the first half 325 and the second half 326 of the groove collar 324 are lodged into the mast groove 310. The first half 325 and second half 326 combine to create the groove collar, which forms a closed perimeter around. A portion of the groove collar 324 may fill the mast groove 310. Another portion of the groove collar 324 protrudes outward from the mast groove 310 and rests above the top surface of the pilot ring 321.

Figure 4D:
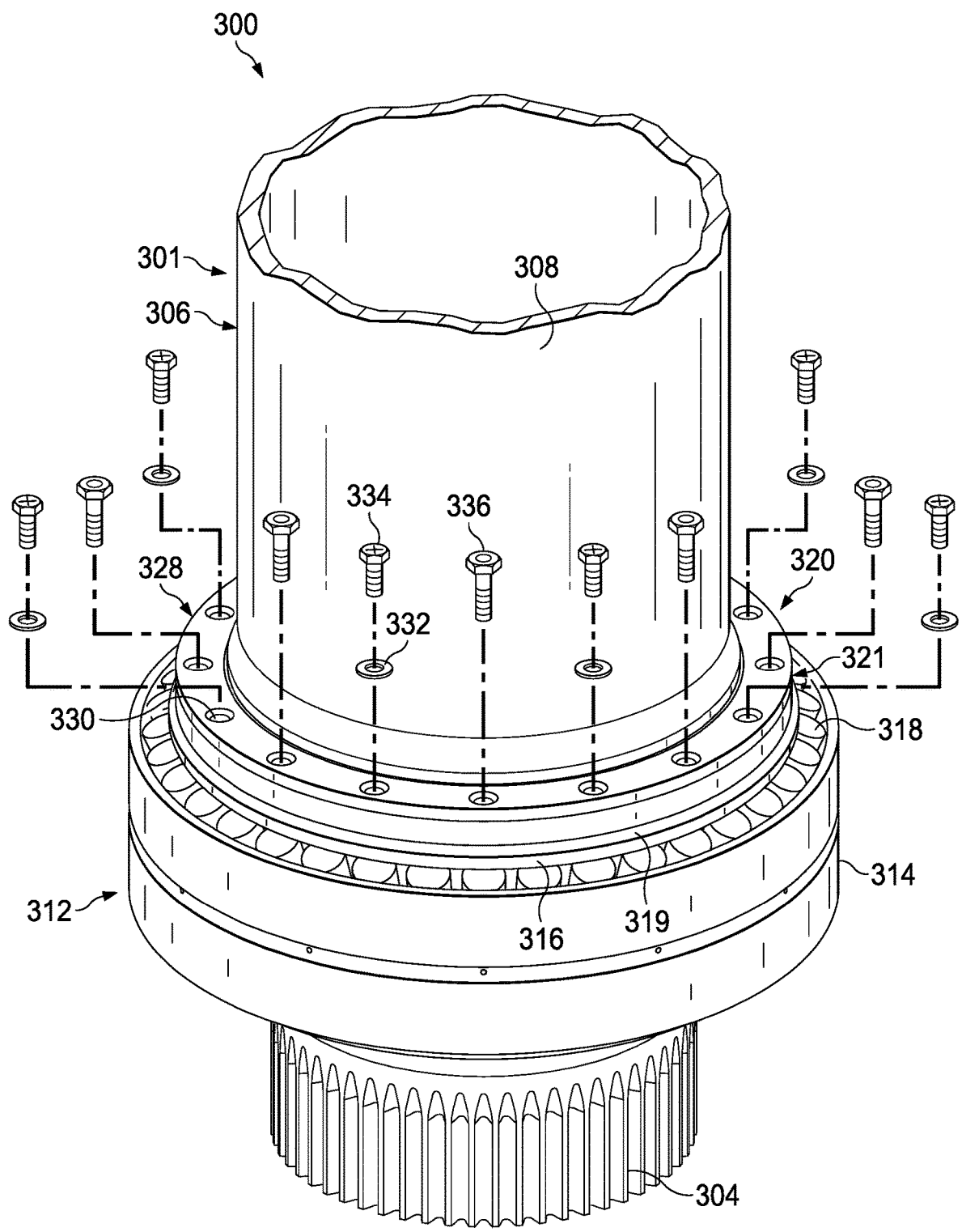

FIG. 4D shows step three in the sequential method for assembling the bearing restraint 320. In step three, the retaining ring 328 is lowered onto the pilot ring 321 and pushes the groove collar 324 inward. The bottom surface of the retaining ring 328 is brought to rest on top of the pilot ring 321, in such a manner that the top surface of the pilot ring is covered by the retaining ring 328. Each of the apertures 330 on the retaining ring 328 coaxially align with a corresponding aperture 322 on the pilot ring 321. As the retaining ring 328 is lowered toward the pilot ring 321, the retaining ring 328 sit level with the groove collar 324 and pushes the groove collar 324 inward towards the mast groove 310. The retaining ring 328 ensures that the groove collar 324 is flushed with mast groove 310 and prevents the first half 325 and second half 326 of the groove collar 324 from dislodging from the mast groove 310. In its final position, the retaining ring 328 enshrouds the groove collar 324 and mast groove 310.

Figure 4E:
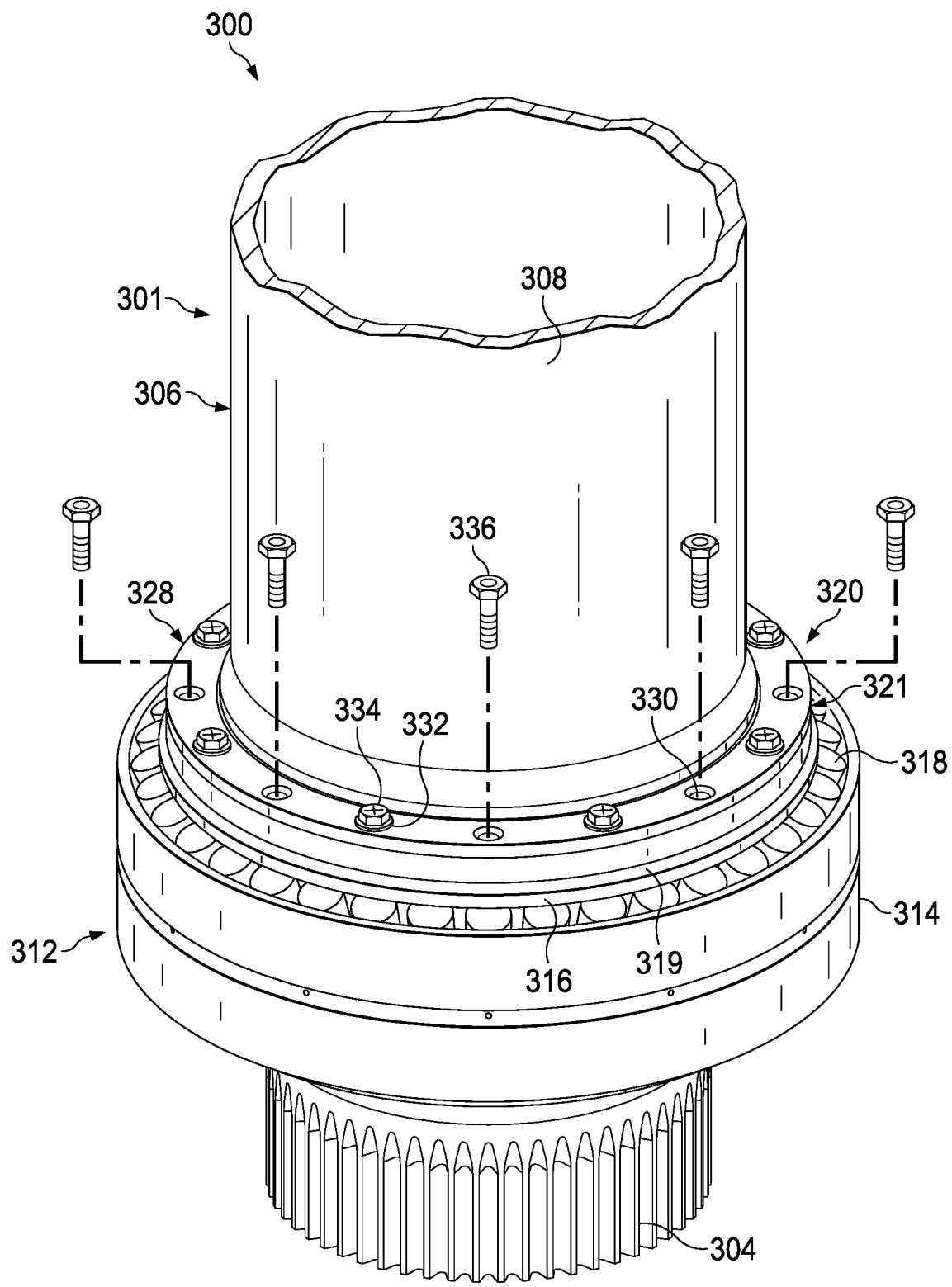

FIG. 4E shows step four in the sequential method for assembling the bearing restraint 320. In step four, the plurality of retaining ring bolts 334 are fastened to the bearing restraint 320. The plurality of retaining ring bolts 334 are initially inserted into every other aperture 330 on the retaining ring 328. The retaining ring bolts 334 extend into the corresponding apertures 322 on the pilot ring 321, where the retaining ring bolts 334 are torqued and mated to the threaded surface of the apertures 322. A washer 332 may be used to protect the top surface of the retaining ring 328. The retaining ring bolts serve to couple the retaining ring 328 to the pilot ring 321. The remaining open apertures 322, 330 mate with the plurality of preload bolts 336 in step five.

Figure 4F:
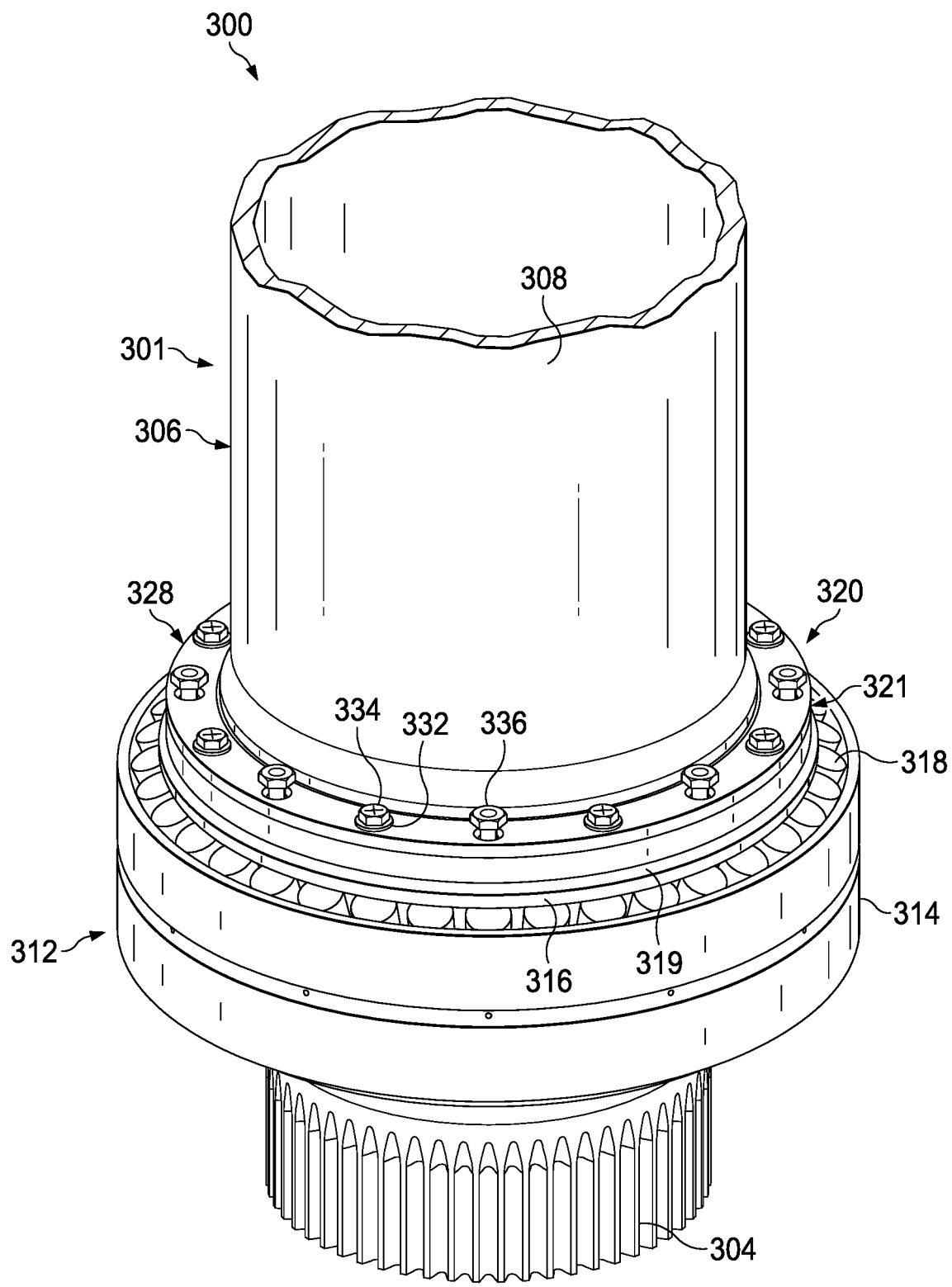

FIG. 4F shows step five in the sequential method for assembling the bearing restraint 320. Additionally, FIG. 4F shows the fully assembled bearing restraint 320. In step five, the plurality of preload bolts 336 are fastened to the bearing restraint 320. The plurality of preload bolts 336 are inserted into the remaining open apertures 330 on the retaining 328. The preload bolts 336 extend into the corresponding apertures on the pilot ring, where the retaining bolts are torqued and mated to the threaded surface of the apertures 322. The preload bolts 336 serve to tension load the bearing restraint 320 to the radial bearing 312. The tops of the preload bolts protrude out from the apertures 330 above the top surface the retaining ring 328; so, washers are not necessary.

The fully assembled bearing restraint 320, longitudinally fixes the radial bearing 312 in place. Specifically, the protruding portion of the groove collar 324, as best seen in FIG. 4C, resists longitudinal motion from the radial bearing 312. The bearing restraint 320 interfacing with the mast groove 310 serves as an alternative to threaded radial bearings and threaded rotor masts.

Figure 5:
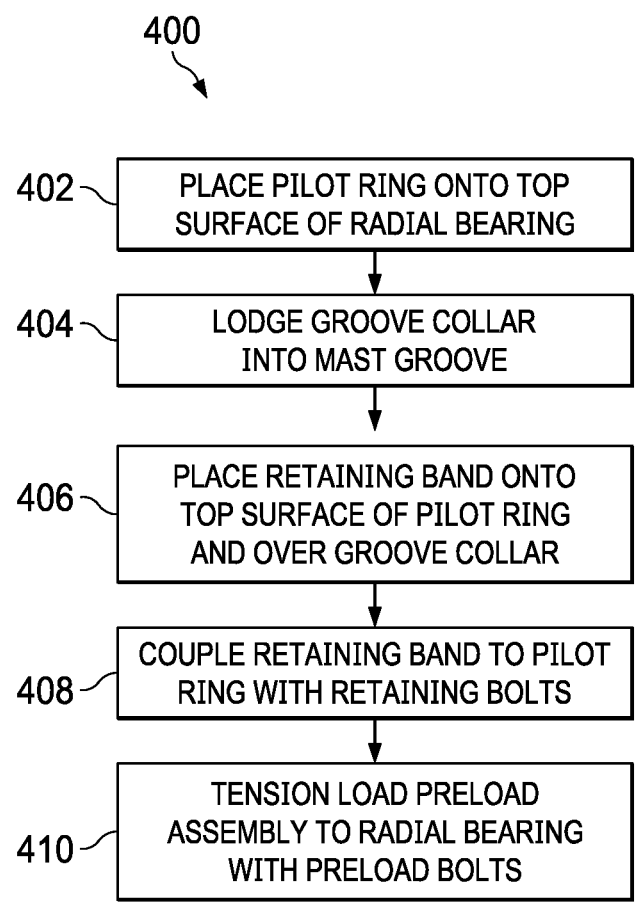
FIG. 5 is a flowchart of a sequential method for assembling a bearing restraint in accordance with embodiments of the present disclosure.

FIG. 5 is a flowchart of a sequential method 400 for assembling a bearing restraint 320 for a rotor mast assembly 300, wherein the rotor mast assembly 300 includes a radial bearing 312 and a rotor mast 301 with a mast groove 310 situated above radial bearing 312. In step 402 of the method 400, a pilot ring 321 is lowered onto the top surface of the radial bearing 312. In step 404, a groove collar 324 is lodged into the mast groove 310, in such a manner that a portion of the groove collar 324 protrudes outward from the mast groove 310 over the top surface of the pilot ring 321. In step 406, a retaining ring 328 is lowered onto the pilot ring 321 and overlaps with the groove collar 324 and mast groove 310. In step 406, the retaining ring 328 pushes the groove collar 324 inwards towards the mast groove 310 and ensures that the groove collar 324 cannot dislodge from the mast groove 310. In step 408, retaining bolts 334 are used in conjunction with threaded apertures 330 to couple the retaining ring 328 to the pilot ring 321. In step 410, preload bolts 336 are used in conjunction with threaded apertures 332 to tension load the bearing restraint 320 to the radial bearing 312.

What is claimed is:

1. A drive system comprising:
a driveshaft including:
a first end;
a second end;
a central axis;
a hollow center originating at and extending outward from the central axis; and
a driveshaft wall oriented about the central axis, the driveshaft wall including:
an interior surface defining a boundary of the hollow center; and
an exterior surface positioned further outward from the central axis than the interior surface, the exterior surface including a circumferential groove therein between the first end and the second end;
a first bearing mounted to the driveshaft and positioned in closer proximity to the second end than the circumferential groove; and
a bearing restraint positioned in closer proximity to the first end than the first bearing, the bearing restraint including:
a protruding structure lodged within and protruding outward from the circumferential groove, the protruding structure being a groove collar;
a planar surface mounted to the first bearing; and
a retaining ring in contact with an outer surface of the groove collar, wherein the groove collar and the retaining ring both contact the planar surface.

2. The drive system of claim 1, wherein the driveshaft is a rotor mast for a rotor system.

3. The drive system of claim 2, further comprising a second bearing coaxial to the first bearing.

4. The drive system of claim 3, wherein the second bearing is positioned in closer proximity to the first end than the circumferential groove.

5. The drive system of claim 1, wherein:
an inner surface of the groove collar is lodged within the longitudinal circumferential groove; and
the outer surface of the groove collar protrudes from the circumferential groove in closer proximity to the first end than the planar surface.

6. The drive system of claim 1, wherein the planar surface is a pilot ring in closer proximity to the second end than the circumferential groove.

7. The drive system of claim 6, wherein the retaining ring is mounted to the pilot ring.

8. The drive system of claim 7, wherein the groove collar further comprises:
a first collar piece; and
a second collar piece;
wherein, the first collar piece and the second collar piece are configured to combine to form a closed perimeter.

9. The drive system of claim 8, wherein the retaining ring is configured to compress and combine the first collar piece and the second collar piece together.

10. The drive system of claim 1, wherein the retaining ring includes an inner surface that is askew relative to the exterior surface of the driveshaft wall.

11. The drive system of claim 1, wherein the retaining ring is configured to push in on the outer surface of the groove collar to force an inner surface of the groove collar inward towards the circumferential groove.

12. A method of constructing a bearing restraint for a rotor mast assembly, comprising:
providing a rotor mast, the rotor mast including:
a first end;
a second end;
a central axis;
a hollow center originating at and extending outward from the central axis; and
a mast wall oriented about the central axis, the mast wall including:
an interior surface defining a boundary of the hollow center; and
an exterior surface positioned further outward from the central axis than the interior surface, the exterior surface defining a circumferential groove between the first end and the second end, the exterior surface being configured to shift inward towards the central axis;
positioning a bearing in closer proximity to the second end than the circumferential groove;
positioning a bearing restraint in closer proximity to the first end than the bearing, the bearing restraint including:
a protruding structure comprising a groove collar; and
a planar surface;
lodging the protruding structure into the circumferential groove and allowing a portion of the protruding structure to protrude outward from the circumferential groove;
mounting the planar surface to the bearing; and
applying a retaining ring so that the retaining ring is in contact with an outer surface of the protruding structure, wherein the groove collar and the retaining ring both contact the planar surface.

13. The method of claim 12, the method further comprising:
lodging an inner surface within the circumferential groove; and
allowing the outer surface to protrude outside the circumferential groove.

14. The method of claim 13, wherein the planar surface is a pilot ring, the method further comprising mounting the pilot ring in closer proximity to the second end than the circumferential groove.

15. The method of claim 14, further comprising mounting the retaining ring to the pilot ring.

16. An aircraft comprising:
a fuselage;
a rotor system including:
a rotor hub;
a plurality of rotor blades; and
a rotor mast comprising the roter mast having:
a first end;
a second end;
a central axis;
a hollow center originating at and extending outward from the central axis; and
a mast wall oriented about the central axis, the mast wall including:
an interior surface defining a boundary of the hollow center; and
an exterior surface positioned further outward from the central axis than the interior surface, the exterior surface defining a circumferential groove between the first end and the second end, the exterior surface being configured to shift inward towards the central axis;

a radial bearing connected to the rotor mast on a side of the circumferential groove that is in closer proximity to the second end than the circumferential groove; and a bearing restraint in closer proximity to the first end than the radial bearing, the bearing restraint including:

a protruding structure lodged within and protruding outward from the circumferential groove, the protruding structure being a groove collar;

a planar surface mounted to the radial bearing; and a retaining ring in contact with an outer surface of the groove collar, wherein the groove collar and the retaining ring both contact the planar surface.

17. The aircraft of claim 16, wherein the rotor system is configured to generate lift for the aircraft.

18. The aircraft of claim 17, wherein an inner surface of the groove collar is lodged within the circumferential groove and the outer surface of the groove collar protrudes outside of the circumferential groove in closer proximity to the first end than the planar surface.

19. The aircraft of claim 18, wherein the planar surface is a pilot ring in closer proximity to the second end than the circumferential groove.

* * * * *